United States Patent [19]
Ebbeson

[11] Patent Number: 5,881,573
[45] Date of Patent: Mar. 16, 1999

[54] REFRIGERATING DEVICE WITH COOLING UNIT WORKING INTERMITTENTLY

[75] Inventor: Bengt Ebbeson, Ettenhausen, Switzerland

[73] Assignee: Electrolux Leisure Appliances AB, Stockholm, Switzerland

[21] Appl. No.: 624,483

[22] PCT Filed: Oct. 6, 1994

[86] PCT No.: PCT/EP94/03237

§ 371 Date: Apr. 5, 1996

§ 102(e) Date: Apr. 5, 1996

[87] PCT Pub. No.: WO96/11368

PCT Pub. Date: Apr. 18, 1996

[51] Int. Cl.[6] .......................... F25B 17/08; F25B 35/04
[52] U.S. Cl. .............................................. 62/480; 62/482
[58] Field of Search ........................... 62/480, 481, 482, 62/476, 101, 106

[56] References Cited

U.S. PATENT DOCUMENTS

| | | | |
|---|---|---|---|
| 1,933,897 | 11/1933 | Elfving | 62/481 |
| 2,276,947 | 3/1942 | Erland Af Kleen | 62/481 |
| 2,278,998 | 4/1942 | Kogel | 62/480 |
| 2,293,556 | 8/1942 | Newton | 62/480 |
| 2,340,886 | 2/1944 | Erland Af Kleen | 62/481 |
| 2,340,887 | 2/1944 | Erland Af Kleen | 62/481 |
| 2,461,262 | 2/1949 | Erland Af Kleen | 62/481 |
| 2,496,459 | 2/1950 | Erland Af Kleen | 62/480 |
| 5,309,985 | 5/1994 | Erickson | 165/104.12 |
| 5,335,519 | 8/1994 | Bernier | 62/481 |
| 5,507,158 | 4/1996 | Bernier | 62/482 |

*Primary Examiner*—William Doerrler
*Attorney, Agent, or Firm*—Pearne, Gordon, McCoy & Granger LLP

[57] ABSTRACT

In a refrigerating device consisting of a housing unit 1 and a cooling unit 2 the cooling unit 2 includes an evaporator 3, a condenser 4 and a reactor 5. The evaportor 3, the condenser 4 and the reactor 5 form a first closed system 27 in which ammonia is provided for as working liquid and manganese chloride 5 is provided for in the sorber part 6 of the reactor 5. The reactor 5 has an insulating shell 16 enclosing the sorber part 6, wherein a working chamber 17 filled with working liquid 18 is reserved between the insulating shell 16 and the sorber part 6. To the working chamber 17 a second closed system 19 is connected in the upper and lower region of the working chamber 17. The upper connection can be closed by means of a shut-off valve 24. By heating the working liquid and thus the sorber part 6 in the regeneration phase by means of a heating means 25 and by cooling the sorber part by means of the working liquid 18 during the sorption phase the efficiency of the refrigerating device is increased substantially.

24 Claims, 3 Drawing Sheets

REFRIGERATING DEVICE WITH COOLING UNIT WORKING INTERMITTENTLY

The invention relates to a refrigerating device including a housing unit and a cooling unit working intermittently, the cooling unit comprising an evaporator accommodated in the housing unit, a condenser and a reactor with a heatable sorber part filled with a substance capable of sorbing a working liquid at standard temperature and again releasing it upon heating, and wherein the evaporator, the condenser and the sorber part are mutually connected by a line and form a closed system.

Refrigerating units of the above kind are in particular used in small-size refrigerating devices and air coolers of air conditioning systems. In the sorber part the substance capable of sorption and enriched with a working liquid is heated and therein releases the absorbed liquid in form of vapor. The vapor condenses in the condenser and the condensed liquid collects in the evaporator arranged in the housing unit of the refrigerating device. When the heat source for the substance capable of sorption is switched off and the substance cools down, the material sucks in the moisture from the line saturated with vapor and therein creates low pressure in the line, which makes evaporate the liquid contained in the evaporator and, if applicable, makes it boil at low temperature. The evaporator therein withdraws heat from the environment in the housing unit and, therefore, can be used as cooling part. Such refrigerating devices are of simple construction and do not include movable parts. As substance capable of sorption e.g. a zeolite reacting with water in the above-described manner can be used. The water therein due to the low pressure will boil at few degrees and, if applicable, also in case of minus degrees in the evaporator. For refrigerating devices of this kind, however, also other sorption substances and liquids are suited, like e.g. salt and ammonia.

When expelling the liquid from the substance capable of sorption it is important that the substance is heated as uniformly as possible. This creates difficulties in particular then when heating is effected using a heat source—as is the case in refrigerating units—which is to be independent from the kind of heating (electric current, gas, dry fuel and the like). As the temperature of a flame is very high as compared to the amount of heat produced, it is important in a sorber part of the kind in discussion to transfer the heat to the substance capable of sorption such that local overheating is avoided. A further demand lies in that overheating of the sorber part should be avoided in the desorption phase because then the sorption activity of the sorber part will slowly calm down and thus cooling in the housing wall of the refrigerating device is reduced.

The invention, therefore, is based on the object of arranging and designing the reactor accommodating the sorber part in a refrigerating device of the generic kind such that the efficiency of the sorption and regeneration phases of the cooling unit is improved and safe functioning of the intermittent operation is guaranteed in spite of a simple construction and the use of different heating sources.

In accordance with this present invention, the reactor of the cooling unit is equipped with a second closed system filled with a working liquid, which system in the sorption phase of the refrigerating unit is controllable as cooling system for the sorber part and in the regeneration phase of the refrigerating unit—as heating system for the sorber part. Thus, two closed systems are provided for which in advantageous manner are connected in parallel to one another and are evacuated prior to being filled with working liquid. The first system essentially consists of the evaporator arranged in an insulation in the upper part of the housing unit of the refrigerating device and comprising a container for receiving the working liquid as well as a pipe protruding from the container in downward direction into the space to be cooled and an evaporator pipe connected subsequently thereto and reaching until above the level of working liquid in the container. Furthermore, the first closed system comprises a connecting line between the evaporator and the sorber part, said line consisting of several sections, namely a pipeline essentially extending perpendicularly with a comparatively small cross-sectional area, which is followed by a snake-shaped ascending, pipeline having a larger cross-sectional area and which again engages with the sorber part by means of a descending pipeline, the end of said descending line having corresponding openings through which the evaporated working liquid can penetrate into the substance capable of sorption. As working liquid e.g. ammonia offers itself, which in vapor form enters the substance capable of sorption, e.g. manganese chloride by the strong affinity of which to ammonia is sorbed. The reactor itself in advantageous manner can consist of two housing parts arranged concentrically and with a distance to one another, the inner housing part being the sorber part filled with sorption material and the outer housing part being an insulating shell completely surrounding the sorber part. The space located between the two housing parts is filled with the working liquid of the second closed system, the second closed system being connected to the working chamber of the reactor in an upper and a lower region.

The heating means of the sorber part can be arranged in the lower portion of the working chamber of the reactor and can be washed around by the working liquid, namely water. However, according to a further embodiment it also is conceivable that the heating means is arranged in a small separate chamber connected to an upper and a lower section of the working chamber for forming a heating circulation. Therein, the heating means can advantageously be an electrical heating cartridge and in addition a gas-heated pipe guided along the working chamber can be provided for in the area of the heating cartridge in particular, this permitting in advantageous manner that either electrical energy or also gas or dry fuel, respectively, or the like can be used as heat source or, however, for achieving a particularly high heating efficiency both heating means can be used simultaneously. In this way the refrigerating device in accordance with the present invention becomes independent from the kind of energy and thereby it can be used in hotels, camping vehicles or boats.

For safety reasons a separate connecting line can be provided for outside of the working chamber between the lower connecting line of the second closed system and the lower connecting line of the heating circulation. This connecting line as safety means can serve for providing the comparatively small heating chamber of the heating cartridge with return water from the second closed system for avoiding that the heating cartridge is not washed with water.

In advantageous manner, the second closed system includes a heat-insulated ascending tube connected to the upper region of the working chamber of the reactor as well as snake-shaped cooling pipe connected subsequently thereto, a reservoir and a descending pipe connecting the latter with the lower region of the working chamber. A shut-off valve which is opened in the sorption phase and is closed in the regeneration phase is provided for in the ascending pipe above the sorber part.

According to a further advantageous feature of the invention, the reactor can be disposed in the lower portion of the refrigerating device and the reservoir can be located above the sorber part of the reactor. This has the advantage that in the sorption phase in case of opened valve the working chamber can be completely filled with liquid from the reservoir due to gravity . In another embodiment the reactor can be arranged in the upper portion of the refrigerating device and the reservoir can be located below the sorber part of the reactor, here, however, a pump being provided for in the second closed circulation. The advantage of this construction lies in that in case of the pump being switched off in the regeneration phase the working liquid can flow back from the working chamber into the reservoir by means of gravity. In contrast thereto, the pump starts working in the sorption phase for pumping liquid from the reservoir into the working chamber, where it washes around the sorber part and cools it.

Switching of the cooling unit from sorption operation to regeneration operation or vice versa preferably is effected in dependence on a given measurable variable. This measurable variable may be the temperature of the cooling water, e.g., in the second closed system or it may correspond to a given heat output of the reactor part during the sorption phase or finally it also is conceivable that the time is detected in which a given amount of ammonia, maybe the entire amount, is evaporated so that the container 7 is empty and thus the sorption activity of the sorber part is finished. Finally, it also is conceivable that the measurable variable is predetermined by adjusting a thermostat in the cooling chamber of the refrigerating device. It this temperature is reached, an electrical switching of the valve or switching on, respectively, or off of the heating means can be effected.

Further features, details and advantages of the invention result from the subsequent description of preferred embodiments with reference to the drawings, wherein.

Figure 1:
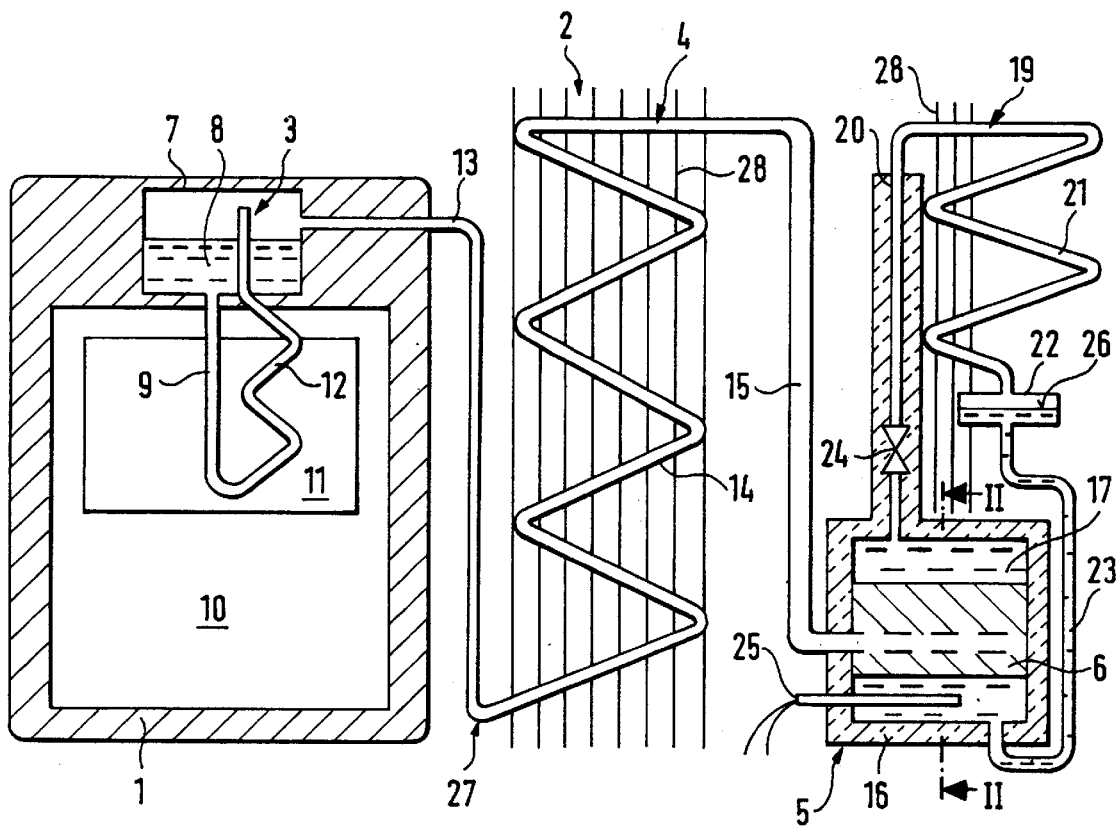
FIG. 1 shows a schematic total view of the refrigerating device according to the present invention.

The refrigerating device in accordance with the present invention essentially includes a housing unit 1 and a cooling unit 2. The cooling unit 2 works intermittently, and essentially consists of an evaporator 3 arranged in an insulated part of the housing unit, a condenser 4 and a reactor 5 with a heatable sorber part 6.

The evaporator 3 comprises a container 7 partly filled with the working liquid ammonia 8. Starting from the bottom of the container, a cooling pipe 9 extends in downward direction into the space 10 to be cooled, of the housing unit 1 and is connected to a cooling plate 11. The cooling pipe 9 is followed by an evaporator pipe 12 reaching into the container 7 upwardly above the level of the liquid.

The evaporator 3 is connected to a pipeline 13 essentially extending vertically which is followed by a serpentine or snake-shaped pipeline 14 and a vertical pipe 15. The cross-sectional area of the snake-shaped pipeline 14 and the vertical pipe 15 is greater than that of the pipeline 13. The pipe 15 protrudes into the sorber part 6 of the reactor 5 and comprises openings through which the evaporated ammonia can penetrate into he sorption material.

The reactor 5 essentially consists of two housing parts 6 and 16 respectively, the housing part 6 corresponding to the sorber part, whereas the housing part 16 is an insulating shell enclosing the sorber part on the front face in positive manner and on the shell side with a distance to the sorber part outside surface. In this way a working chamber 17 completely or partly filled with the working liquid 18 (water in particular) is defined between the sorber part 6 and the insulating shell. In the upper and lower sections of the working chamber 17 a second closed system 19 is connected to the reactor 5. This second closed system essentially includes a heat-insulated ascending pipeline 20, a snake-shaped cooling pipe 21 connected subsequently thereto, a reservoir 22 and a descending pipe 23 connecting the latter with the lower section of the working chamber 17. A shut-off valve 24 the function of which will be explained later is disposed in the ascending pipeline 20.

Figure 2:
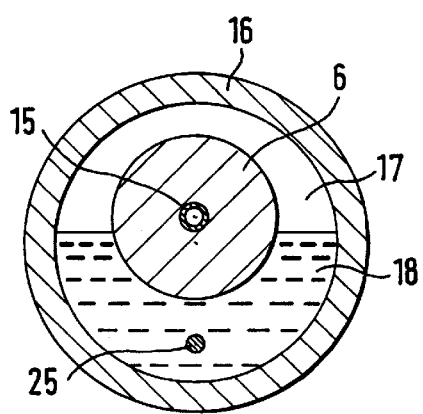
FIG. 2 shows a schematic cut view along the line II—II of FIG. 1.

A heating means 25, in this embodiment being an electrical heating cartridge, is provided for below the sorber part 6 within the working chamber 17. As can be seen, the electrical heating cartridge 25 is completely washed around by working liquid 18. In case of an opened valve 24 the liquid level 26 is reached so that the sorber part 6 and the heating means 25 are washed around with water completely. This operational position characterizes the sorber phase, which will still be discussed further hereinafter. In the regeneration phase during which the heating cartridge 26 is working an operational condition as shown in FIG. 2 can be established in which rising vapor in the upper part of the working chamber with closed valve 24 creates such a pressure condition that the working liquid 18 is pressed through the descending pipe 23 to the reservoir 22.

As can further be seen from FIG. 1, the reactor 5 is disposed in the lower part of the refrigerating device in lying position. The first closed system 27 which is composed of the evaporator 3, the pipelines 13, 14, 15 and the sorber part 6, is connected in parallel to the second closed system 19. Both systems are evacuated closed systems and are located one beside the other on the backside and outside of the housing unit, wherein the heat is emitted to the outside, for example by radiators 28 in common manner to the ambient air.

The following figures are different embodiments, however, corresponding parts are marked with corresponding reference numbers. Nor is the entire refrigerating device shown, but only the reactor part with the second closed system 19.

Figure 3:
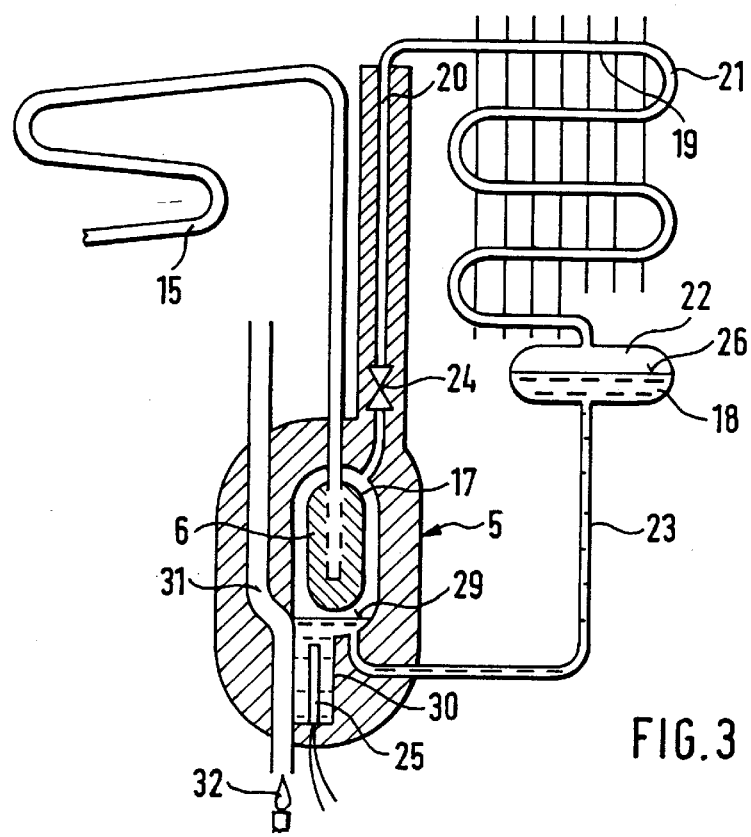
FIGS. 3 to 6 show further preferred embodiments of the reactor part and the system connected thereto.

As can be seen from FIG. 3, the reactor 5 is disposed in vertical direction in the lower part of the housing and the reservoir 22 is located above the sorber part 6 so that the sorber part 6 arranged in the working chamber 17 is completely washed around with working liquid, namely water 18. Also in this embodiment an ascending pipe 20 merging into the cooling pipe 21, the latter being connected to the reservoir 22, is subsequent to the upper part of the working chamber 17. The lower part of the working chamber 17 is connected to the reservoir 22 via the descending pipe 23.

While in case of opened valve—i.e. in the sorption phase—a liquid level 26 is provided for in the system and the sorber part 6 thus is completely washed around by water, in case of closed valve—i.e. in the regeneration phase—an operational condition will occur in which the liquid level sinks down to the level 29, this will, however, be dealt with later.

It furthermore can be seen from FIG. 3 that in the lower portion of the working chamber 17 a separate chamber is provided for in which the electrical heating means 25 is arranged. A heatable gas pipe 31 which is heated by the gas flame 32 and can be used for heating the working liquid in the chamber 30 beside the heating means 25 is disposed in direct contact to the shell surface of the chamber 30. In this way one does not depend on the energy source.

Figure 4:
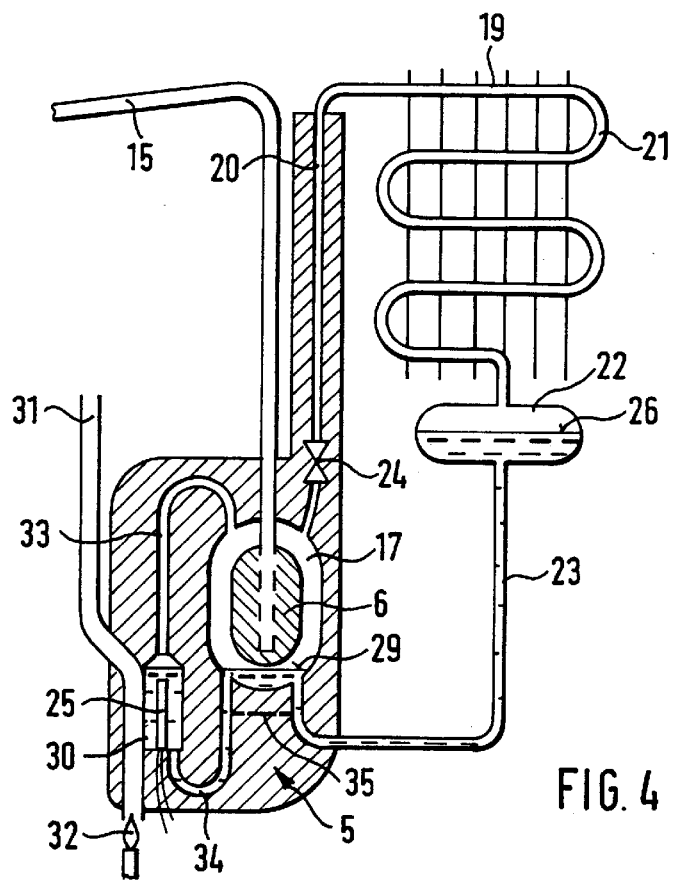

In the embodiment shown in FIG. 4, is can be seen that the chamber 30 now no longer is in direct connection with the working chamber 17 of the reactor 5 but is connected to the upper and lower, respectively, portion of the working chamber 17 through an upper line 33 and a lower line 34. It can further be seen that a connecting line 35 is provided between the descending pipe 23 and the lower line 34, by which it can be guaranteed that a liquid level not being too low is prevailing in the chamber 30 and thereby possibly overheating of the sorber part 6 might be caused. This connecting line 35 therefore more or less takes over a safety function.

Figure 5:
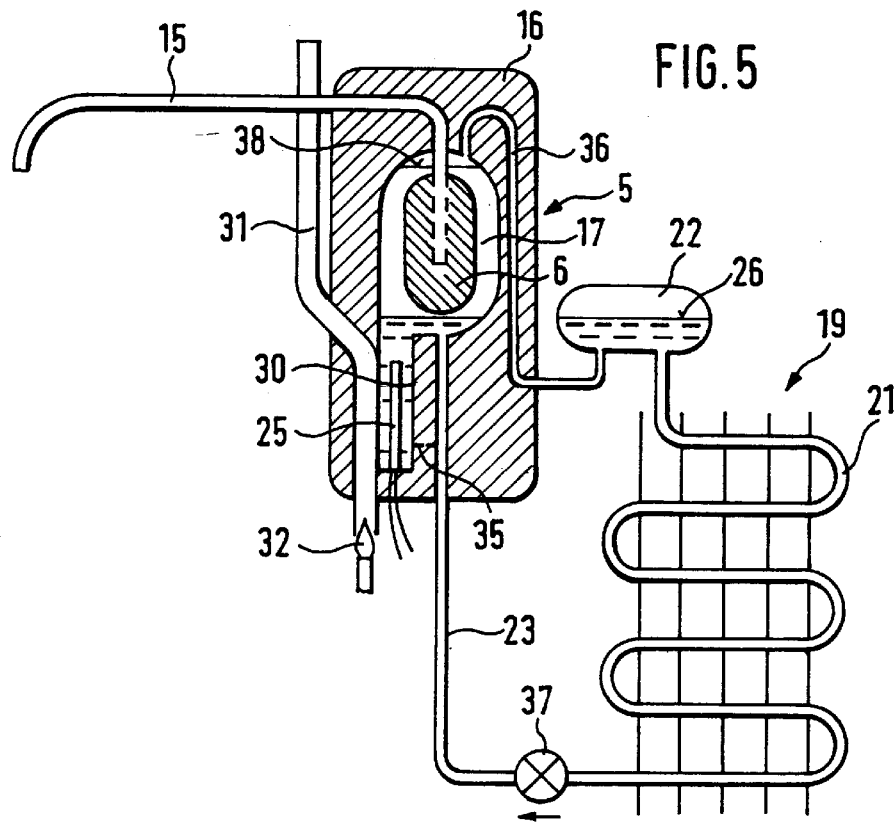
Figure 6:
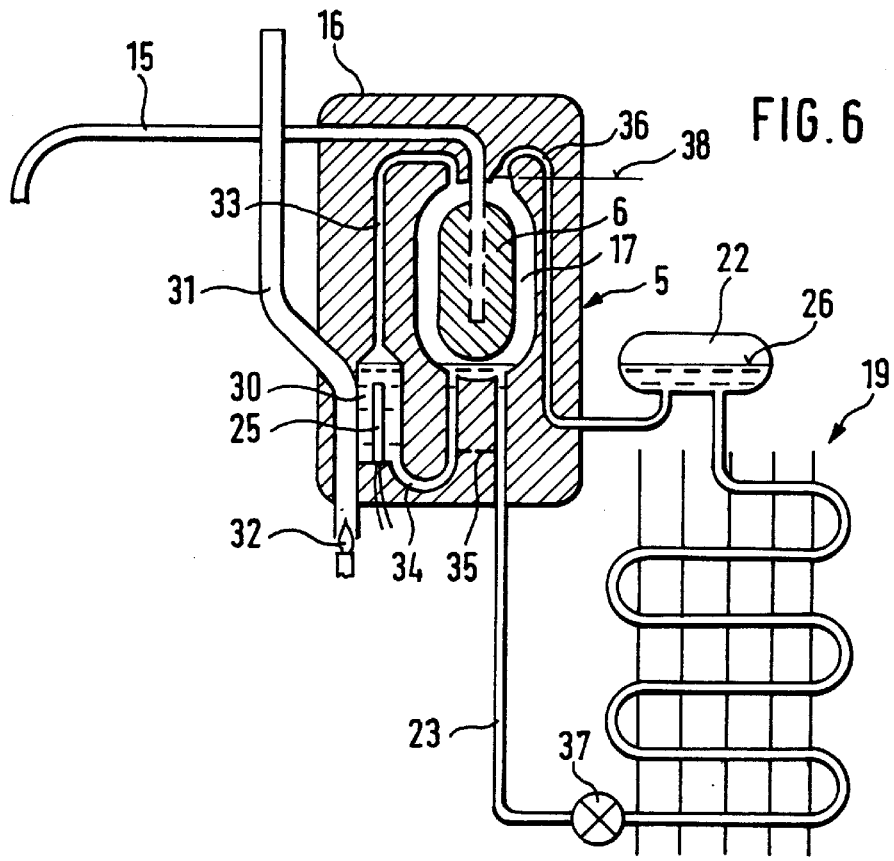

In contrast to the embodiments 3 and 4 in which the reactor 5 is arranged in the lower portion of the refrigerating device and the reservoir 22 is provided for on a higher level, the reactor 5 in the embodiments under FIGS. 5 and 6 is arranged in the upper portion of the refrigerating unit, whereas the reservoir 22 is located below the sorber part 6. Therein the construction of the reactor 5 under FIG. 5 essentially is corresponding to the reactor 5 under FIG. 3, while the reactor 5 under FIG. 6 essentially corresponds to the construction according to reactor 5 under FIG. 4.

It has to be remarked that no shut-off valve is provided for any more in the connecting line 36 by which the second closed system 9 is connected to the upper portion of the working chamber 17. For this reason the connecting line 36 also has a comparatively small cross-sectional area in contrast to the snake-shaped cooling pipe 21. As the level of the liquid 26 due to the particular arrangement of the reservoir 22 is located below the sorber part 6, the liquid has to be pumped into the working chamber 17 with the aid of a pump 37 for achieving the liquid level 38. In this status of the sorption phase the sorber part 6 can be cooled efficiently. In the regeneration phase, however, the pump 37 is switched off and the liquid flows from the working area through the lines 23, 21 back into the reservoir 22. Also in this case a connecting line 35 is provided for between the lines 23 and the separate chamber 30 so that it is guaranteed that always a sufficent amount of water for generating vapor is available in the chamber 30, wherein the vapor streams upwardly and condenses on the sorber part 6 for then again dropping downwardly. In this way an excellent heat transfer from the heating cartridge to the sorber part 6 is achieved and the efficiency of the device is increased substantially.

It may, of course, occur that a minor vapor portion also reaches the reservoir through the line 36, this however not causing remarkable heat losses due to the comparatively small cross-sectional areas of the connecting line 36 and the arrangement thereof within the insulating shell of the reactor 5.

The operating mode of the device in accordance with the present invention is as follows:

During the sorption phase (cooling phase) the shut-off valve 24 in the devices under FIGS. 1 to 4 is open, while in the devices under FIGS. 5 and 6 the pump 37 is switched on. Due to the strong affinity of the manganese chloride in the sorber part 6 the ammonia 8 evaporates in the evaporator 3 and with comparatively low pressure flows through the pipelines 14, 15 into the sorber part 6, where it is absorbed in the manganese chloride. As the ammonia vapor has a very low temperature of, for example −35°, the slight heating during passage through the lines 14 and 15 with low pressure does not cause condensation. In sorption of the ammonia vapor in the sorber part 6 heat is generated, while in the cooling chamber 10 cold is created by absorption of the heat in evaporation of ammonia. As the sorber part without suitable cooling can increase to substantial temperatures and, therefore, the sorption efficiency decreases rapidly, the water contained in the second closed system 19 serves for cooling the sorber part 6. The water which in case of opened valve 24 is at the liquid level 26, for this purpose washes around the entire sorber part along the shell surface thereof. Vapor created by heat given from the sorber part to the cooling agent water raises in the ascending pipe 20 upwardly and condenses in the cooling pipe 21 so that it is returend to the reservoir 26 in form of liquid.

If after some time the sorption operation has terminated by that the ammonia in the evaporator 3 is evaporated completely or that e.g. a particular temperature priority adjusted by a thermostat has been obtained in the cooling chamber 10 or the heating of the sorber part decreases remarkably and, thus, the cooling water temperature decreases, it is switched from the sorption phase to the regeneration phase, this being effected automatically in dependance on the given measuring values. This means e.g. that the valve 24 is closed for the regeneration phase and the heating means 25 is switched on (see FIGS. 1 to 3) and/or, respectively, that the pump 37 is switched off and the heating means 25 and/or 32 is switched on (see FIGS. 5, 6).

In the regeneration phase the ammonia again is expelled from the sorber part and through the lines 15 and 14 returns with comparatively high pressure of, for example 10 to 20 bar and a comparatively high temperature of 180° to 200° C. through the line 13 in liquid form into the container 7 of the evaporator, as it condenses in the cooling line 14. In the reactor 5 the heating output of the heating cartridge 25 causes boiling of the working liquid 18 in the working chamber 17 so that vapor rises upwardly and the liquid presses through the pipe 23 into the reservoir 22, vapor bubbles condensing in the cooling pipe 21 and flowing back into the reservoir in form of water. A very efficient transfer of the heating output of the heating cartridge 25 to the sorber part 6 is achieved by the creation of vapor in the upper portion of the working chamber, since the vapor in the sorber part 6 in the upper portion with complete and close contact condenses on the cooler surface of the sorber region for flowing down as liquid.

In FIG. 4 the vapor pressure causes a lowering of the liquid up to the level 29, i.e. up to below the sorber part 6 so that an excellent heat transfer to the sorber part 6 can be effected by means of the vapor. Apart therfrom this construction under FIG. 4 has the advantage that only a very small portion of water has to be heated in the comparatively small chamber 30 so that this device reacts comparatively quickly.

As soon as the entire ammonia is expelled from the sorber part 6, the device automatically changes back to sorption operation. For this purpose, again regulating values in form of temperature, quantity measurement, time measurement and the like can be used which reveal that the expelling operation has been terminated.

I claim:

1. Refrigerating device including a housing unit (1) and a cooling unit working intermittently, wherein the cooling unit (2) comprises an evaporator (3) received in the housing unit, a condenser (4), and a reactor (5), said reactor including a heatable sorber part (6) filled with a substance capable of sorption which, at standard temperature, absorbs a first working liquid and releases said first working liquid upon heating, and wherein the evaporator and the condenser are connected by a first line and the condenser and the sorber part are connected by a second line and cooperate to form a first closed system containing said first working liquid and permitting bi-directional flow of said first working liquid between said evaporator and said sorber part via said condenser, wherein said reactor (5) is provided with a second (19) closed system filled with a second working liquid (18), said second closed system, in the sorption (cooling) phase of the refrigerating device, serves as a cooling system for the reactor (5) and, in the regeneration phase of the refrigerating device, serves as a heating system for the reactor, and wherein a connection between said condenser and said first line is relatively below a connection between an opposite end of said first line and said evaporator.

2. Refrigerating device as defined in claim 1, wherein said first (27) and said second (19) closed systems are connected in parallel with one another.

3. Refrigerating device as defined in claim 1 or 2, wherein said first (27) and said second (19) closed systems each include a radiator.

4. Refrigerating device as defined in claim 1, wherein said first and second closed systems (19, 27), prior to filling with the working liquids (8, 18), are evacuated.

5. Refrigerating device as defined in claim 1, wherein said first working liquid (8) of the first closed system (27) is ammonia, the sorption material is a salt, and the second working liquid (18) of the second closed system (19) is water.

6. Refrigerating device as defined in claim 1, wherein said evaporator (3) comprises a container (7) disposed in an insulated, upper part of the housing unit (1) and has a cooling pipe protruding into the space to be cooled and being connected to a cooling plate and an evaporator pipe, said evaporator pipe extending into said container and above a level of working liquid therein.

7. Refrigerating device as defined in claim 1, wherein a connecting line between the evaporator and the sorption part of the reactor comprises at least one pipeline (13) with a relatively small cross-sectional area and extending essentially horizontally, and a snake-shaped cooling pipe with a relatively enlarged cross sectional area extending into the reactor, and having a perforated section received in the sorption material.

8. Refrigerating device as defined in claim 1, wherein said reactor comprises two housing parts arranged concentrically and spaced a distance from one another, wherein an inner housing part is the sorber part (6) filled with sorption material and an outer housing part is an insulating shell (16) completely enclosing the sorber part, the working chamber (17) between the housing parts is filled with the second working liquid of the second closed system.

9. Refrigerating device as defined in claim 1, wherein said reactor has a working chamber with upper and lower portions, and said second closed system is connected to said upper portion and said lower portion.

10. Refrigerating device as defined in claim 9, wherein said heating means of the sorber part is disposed in the lower portion of the working chamber of the reactor and is washed by the second working liquid.

11. Refrigerating device as defined in claim 10, wherein said heating means is arranged in a separate chamber (30) connected with an upper and a lower section of the working chamber to form a circulation path.

12. Refrigerating device as defined in claim 10 or 11, wherein said heating means (25) is an electrical heating cartridge.

13. Refrigerating device as defined in claim 10 or 11, wherein said heating means is formed by an electrical heating cartridge and a working chamber filled with a working agent.

14. Refrigerating device as defined in claim 10 or 11, wherein a lower connecting line of the second closed system and of the heater circulation are connected to one another outside of the working chamber of the reactor.

15. Refrigerating device including a housing unit (1) and a cooling unit working intermittently, wherein the cooling unit (2) comprises an evaporator (3) received in the housing unit, a condenser (4), and a reactor (5), said reactor including a heatable sorber part (6) filled with a substance capable of sorption which, at standard temperature, absorbs a first working liquid and releases said first working liquid upon heating, and wherein the evaporator, condenser, and sorber part are fluidly connected and cooperate to form a first closed system containing said first working liquid, wherein said reactor (5) is provided with a second (19) closed system filled with a second working liquid (18), said second closed system, in the sorption (cooling) phase of the refrigerating device, serves as a cooling system for the reactor (5) and, in the regeneration phase of the refrigerating device, serves as a heating system for the reactor, and wherein said reactor defines a working chamber surrounding said sorber part, said working chamber having an upper portion and a lower portion, said second closed system comprises a heat-insulated ascending pipe (20) connected to the upper portion of the working chamber, a cooling pipe (21) connected to an opposite end of said ascending pipe, a reservoir (22), and a descending pipe (23) connecting the reservoir to the lower portion of the working chamber.

16. Refrigerating device as defined in claim 15, wherein a shut-off valve (24) is arranged in said ascending pipe (24).

17. Refrigerating device as defined in claim 16, wherein said shut-off valve (24) is open during the sorption phase and is closed during the regeneration phase.

18. Refrigerating device as defined in claim 15, wherein said reactor (5) is arranged in a lower portion of the refrigerating device and the reservoir is disposed above the sorber part of the reactor.

19. Refrigerating device as defined in claim 1, wherein, depending on a given measuring magnitude, the cooling unit switches between the sorption operation and the regeneration operation.

20. Refrigerating device as defined in claim 19, wherein the measuring magnitude corresponds to a given temperature of the cooling water.

21. Refrigerating device as defined in claim 19, wherein the measuring magnitude corresponds to a given heat output of the reactor part.

22. Refrigerating device as defined in claim 19, wherein the measuring magnitude corresponds to a given amount of ammonia in the evaporator.

23. Refrigerating device as defined in claim 19, wherein the measuring magnitude corresponds to a given temperature measurable by an adjustable thermostat in the refrigerating device.

24. Refrigerating device including a housing unit (1) and a cooling unit working intermittently, wherein the cooling unit (2) comprises an evaporator (3) received in the housing unit, a condenser (4), and a reactor (5), said reactor including a heatable sorber part (6) filled with a substance capable of sorption which, at standard temperature, absorbs a first working liquid and releases said first working liquid upon heating, and wherein the evaporator, condenser, and sorber part are fluidly connected and cooperate to form a first closed system containing said first working liquid, wherein said reactor (5) is provided with a second (19) closed system comprising a working chamber (17) and a reservoir (22) and being filled with a second working liquid (18), said second closed system, in the sorption phase of the refrigerating device, serves as a cooling system for the reactor (5) and, in the regeneration phase of the refrigerating device, serves as a heating system for the reactor, and wherein a pump is provided in the second closed system and the reactor (5) is arranged in the upper part of the refrigerating device and the reservoir (22) is arranged below the sorber part of the reactor for enabling a backflow of a part of the working fluid, from the working chamber (17) to the reservoir (22) when the pump is switched off.

* * * * *

UNITED STATES PATENT AND TRADEMARK OFFICE
CERTIFICATE OF CORRECTION

PATENT NO. : 5,881,573
DATED : March 16, 1999
INVENTOR(S) : Ebbeson

It is certified that error appears in the above-identified patent and that said Letters Patent is hereby corrected as shown below:

On the Title Page, Item [73], delete "Switzerland" and insert --Sweden--.

Column 1, Line 59, delete "this" and insert --the--.

Column 2, Line 13, after "ascending", delete --,--

Column 3, Line 63, after "16", insert --,--

Column 4, Line 66, delete "is" and insert --it--.

Column 5, Line 59, after "example", insert --,--

Column 6, Line 10, delete "priority" and insert --priorily--.

Column 6, Line 23, after "example", insert --,--

Column 10, Line 1, after "fluid", delete ","

Signed and Sealed this

Twentieth Day of July, 1999

Attest:

Attesting Officer

Q. TODD DICKINSON

Acting Commissioner of Patents and Trademarks